United States Patent
Musgrove et al.

(10) Patent No.: US 11,802,496 B2
(45) Date of Patent: Oct. 31, 2023

(54) DIRECT-FIRED SUPERCRITICAL CARBON DIOXIDE POWER CYCLE THAT GENERATES POWER AND HYDROGEN

(71) Applicant: Southwest Research Institute, San Antonio, TX (US)

(72) Inventors: Grant O. Musgrove, San Antonio, TX (US); Brian Connolly, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 17/657,472

(22) Filed: Mar. 31, 2022

(65) Prior Publication Data
US 2023/0313712 A1    Oct. 5, 2023

(51) Int. Cl.
| | |
|---|---|
| *F01K 25/10* | (2006.01) |
| *F01K 19/00* | (2006.01) |
| *F01K 17/04* | (2006.01) |
| *F01K 7/32* | (2006.01) |
| *F02C 6/04* | (2006.01) |

(52) U.S. Cl.
CPC .............. *F01K 25/103* (2013.01); *F01K 7/32* (2013.01); *F01K 17/04* (2013.01); *F01K 19/00* (2013.01); *F02C 6/04* (2013.01)

(58) Field of Classification Search
CPC .......... F01K 25/103; F01K 7/32; F01K 17/04; F01K 19/00; F02C 6/00; F02C 6/04; F02C 6/06; F02C 6/10; F02C 3/00–365
See application file for complete search history.

(56) References Cited

U.S. PATENT DOCUMENTS

| | | | | |
|---|---|---|---|---|
| 5,927,063 | A * | 7/1999 | Janda ................... | F01K 21/042 60/39.12 |
| 8,596,075 | B2 * | 12/2013 | Allam ..................... | F02C 3/20 60/39.5 |
| 2005/0123810 | A1 * | 6/2005 | Balan .................. | H01M 8/0612 429/432 |
| 2014/0088773 | A1 * | 3/2014 | Davidson ................ | H02K 7/18 700/288 |
| 2014/0230445 | A1 * | 8/2014 | Huntington ............... | F02C 9/28 165/4 |

(Continued)

FOREIGN PATENT DOCUMENTS

| | | |
|---|---|---|
| EP | 0884099 A2 * | 12/1998 |
| WO | 2020250194 | 12/2020 |

OTHER PUBLICATIONS

Brun, et al., "Fundamentals and Applications of Supercritical Carbon Dioxidee (sCO2) Based Power Cycles", Woodhead Publishing Series in Energy, 2017, 29 pages.

(Continued)

*Primary Examiner* — Mark A Laurenzi
*Assistant Examiner* — Xiaoting Hu
(74) *Attorney, Agent, or Firm* — Grossman, Tucker, Perreault & Pfleger, PLLC

(57) ABSTRACT

Direct-fired supercritical carbon dioxide ($CO_2$) power cycle that generates hydrogen. More specifically, the discharge of a direct fired supercritical $CO_2$ power cycle is converted to carbon dioxide and hydrogen where the hydrogen and/or carbon dioxide can be separated and stored/utilized in another application.

6 Claims, 3 Drawing Sheets

(56) References Cited

U.S. PATENT DOCUMENTS

2018/0073430 A1* 3/2018 Forrest .................. C10K 1/002
2021/0404381 A1  12/2021 Lee et al.

OTHER PUBLICATIONS

Delimont, et al., "Computational Modeling of a Direct Fired Oxy-Fuel Combustor for sCO2 Power Cycles", The 6th International Supercritical CO2 Power Cycles Symposium, Mar. 27-29, 2018, Pittsburg, Pennsylvania, 11 pages.

Parks, et al., "Hydrogen Station Compression, Storage, and Dispensing Technical Status and Costs", NREL Technical Monitor: Neil Popovich, Golden, CO, 2014, 74 pages.

Sircar, et al., "Pressure Swing Adsorption Technology for Hydrogen Production", Hydrogen and Syngas Production and Purification Technologies, 2010, pp. 414-450.

* cited by examiner

DIRECT-FIRED SUPERCRITICAL CARBON DIOXIDE POWER CYCLE THAT GENERATES POWER AND HYDROGEN

FIELD

The present invention stands directed at a direct-fired supercritical carbon dioxide ($CO_2$) power cycle that generates hydrogen. More specifically, the discharge of a direct-fired oxy-combustor utilized in the supercritical $CO_2$ power cycle is converted to carbon dioxide and hydrogen where the hydrogen and/or carbon dioxide can be separated and stored/utilized in another application.

BACKGROUND

A supercritical $CO_2$ ($sCO_2$) power cycle is a promising technology that utilizes $CO_2$ as the working fluid in a power cycle rather than typical fluids such as steam or air. Supercritical $CO_2$ refers to the state of the $CO_2$ fluid in that it is higher than the fluid critical temperature and critical pressure, which is 31° C. (88° F.) and 7.377 MPa (1,070 psia) for $CO_2$. The benefits of using $sCO_2$ as the working fluid in a power cycle are the relatively high density of the fluid and the near-ambient fluid supercritical temperature. This results in power generating efficiencies greater than 50% at cycle temperatures of 600° C. (1,110° F.). As the technology matures, higher efficiencies appear possible with relatively higher cycle temperatures, such as 1000° C. (1,830° F.), which is common for conventional gas turbine power generation with air as the working fluid.

In an $sCO_2$ power cycle, a Brayton or Rankine cycle is commonly used to generate power. For either cycle, heat input is required to raise the temperature of $sCO_2$ before extracting the energy using an expander, such as a turbomachine. The current approach to add heat is through a heat exchanger, which is a component that transfers heat from a hot fluid to the $sCO_2$ fluid. This is important to generating power because maximizing the heat input leads to higher power generating efficiency. However, there are a number of limitations to this approach. First, material technology limits the maximum temperature of an $sCO_2$ heater. Second, heat exchangers for $sCO_2$ are relatively expensive due to the material, size, and manufacturability. Finally, heat exchangers are not capable of transferring all available heat from one fluid to another in a practical size. To overcome the limits of the heat exchanger, a direct-fired method is used to release heat from a combusted fuel directly into the $sCO_2$ fluid. This is much like a conventional gas turbine Brayton cycle with air as the fluid, where the air is heated directly by combustion.

For direct-fired oxy-combustion, an oxidizer and fuel are injected and mixed in the $sCO_2$ flow and then ignited to release the heat from the fuel. See FIG. 1 (prior art). A benefit to this reaction compared to conventional air combustion is that it can be done without generating nitrous oxides (NOx) when using a pure fuel, such as methane ($CH_4$) and a pure oxidizer, such as oxygen ($O_2$). Nevertheless, the products of the reaction of $CH_4$ and $O_2$ are primarily CO, $H_2O$, and $CO_2$, as shown in the chemical equation below. For high combustion efficiency, the CO and any unburned $O_2$ and $CH_4$ may be reduced.

$$2CO_2+O_2+CH_4 \rightarrow CO_2+2H_2O+2CO$$

Aside from the technical challenges, both known and unknown, of combustion in a high-pressure $CO_2$ environment, the post-combustion products of water ($H_2O$) and carbon monoxide (CO) provide a source of contamination for the power cycle, which relies on a closed-loop flow of the working fluid $CO_2$. See again, FIG. 1.

The removal of water is important to avoid the formation of carbonic acid ($H_2CO_3$) that can have detrimental effects to the piping, instrumentation, and machinery that make up the power cycle. Additionally, the presence of water in the loop also leads to potential condensation in other parts of the cycle and performance losses in the turbomachinery. The buildup of carbon monoxide will also change the composition of the working fluid such that the CO will eventually reduce the power cycle performance.

While this is a known issue, the current solutions are to utilize a liquid water separator vessel to remove the water and monitor the CO concentration to periodically vent the loop to remove the CO buildup and add pure $CO_2$ to make up for the vented mass. See again, FIG. 1. Both of these solutions are practical, but not ideal. The liquid water separator results in an additional cycle component that must operate at relatively high pressure and separate liquid water from $sCO_2$. The density ratio of water to $CO_2$ at supercritical pressures is near unity, which makes the separation challenging. Furthermore, the liquid separator may remove a majority of the liquid water, but not all of the liquid water, and any water vapor will not be separated. Venting the $CO_2$ to limit the CO concentration is also not preferred because it is a release of $CO_2$ and CO to the atmosphere or requires separate storage. Additional pure $CO_2$ is then needed to be compressed and injected into the cycle to make up for the vented $CO_2$.

SUMMARY

A direct-fired supercritical carbon dioxide power generation system comprising a combustor for burning hydrocarbon fuel and oxygen to heat a supercritical $CO_2$ working fluid that provides a combustor output comprising carbon dioxide, carbon monoxide and water wherein the combustor output of carbon dioxide, carbon monoxide and water are delivered to a water gas shift reactor. The combustor output of carbon monoxide and water are then converted in the water gas shift reactor to an output mixture of carbon dioxide and hydrogen. A pressure swing adsorption device or a cryogenic separator is provided that is configured to remove all or a portion of the hydrogen output from the water gas shift reactor along with an expander driven by the carbon dioxide output from the water gas shift reactor.

A direct-fired supercritical carbon dioxide power generation method comprising burning hydrocarbon fuel and oxygen in a combustor and heating a supercritical $CO_2$ working fluid and providing a combustor output comprising carbon dioxide, carbon monoxide and water. A water gas shift reactor is provided for reacting the carbon monoxide and water output from the combustor and forming a water gas shift reactor output mixture of carbon dioxide and hydrogen. This is then followed by separating all or a portion of the hydrogen output from the water gas shift reactor and driving an expander with the carbon dioxide output from the water gas shift reactor.

DETAILED DESCRIPTION

The present invention in one configuration provides a modification to the direct-fired supercritical oxy-combustion power cycle. Two processes are now preferably added to refine the post-combustion components of $CO_2$, water and carbon monoxide, to provide $CO_2$ and hydrogen. The hydrogen may then be selectively captured and removed from the $CO_2$ and utilized elsewhere. Moreover, any excess $CO_2$ that is generated may also be used in other applications or sequestered. In addition, the present invention can preferably eliminate the need for a liquid water separator and/or venting of CO from the cycle.

Figure 1:
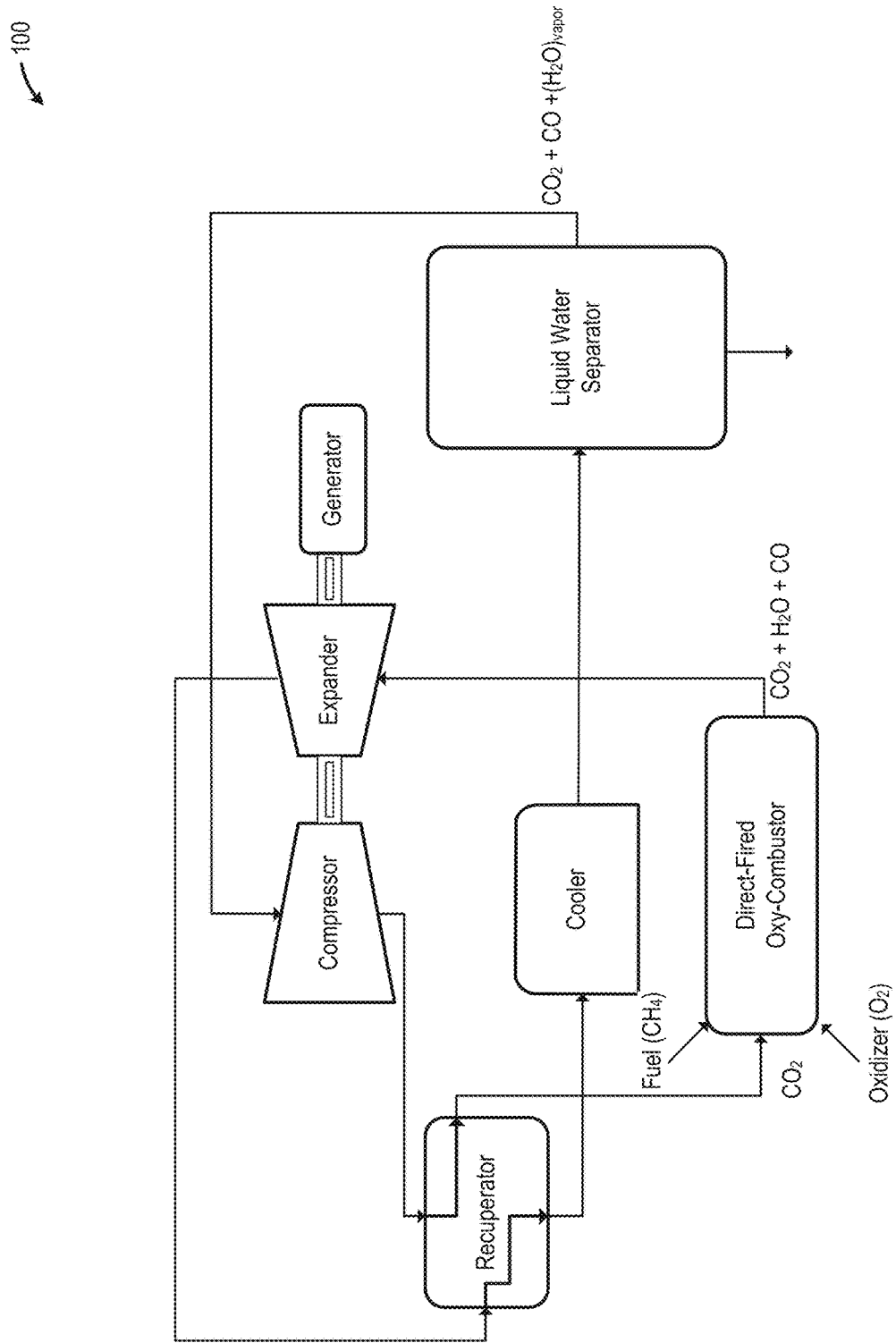
FIG. 1 illustrates a direct-fired supercritical oxy-combustion power cycle of the prior art.
Figure 2:
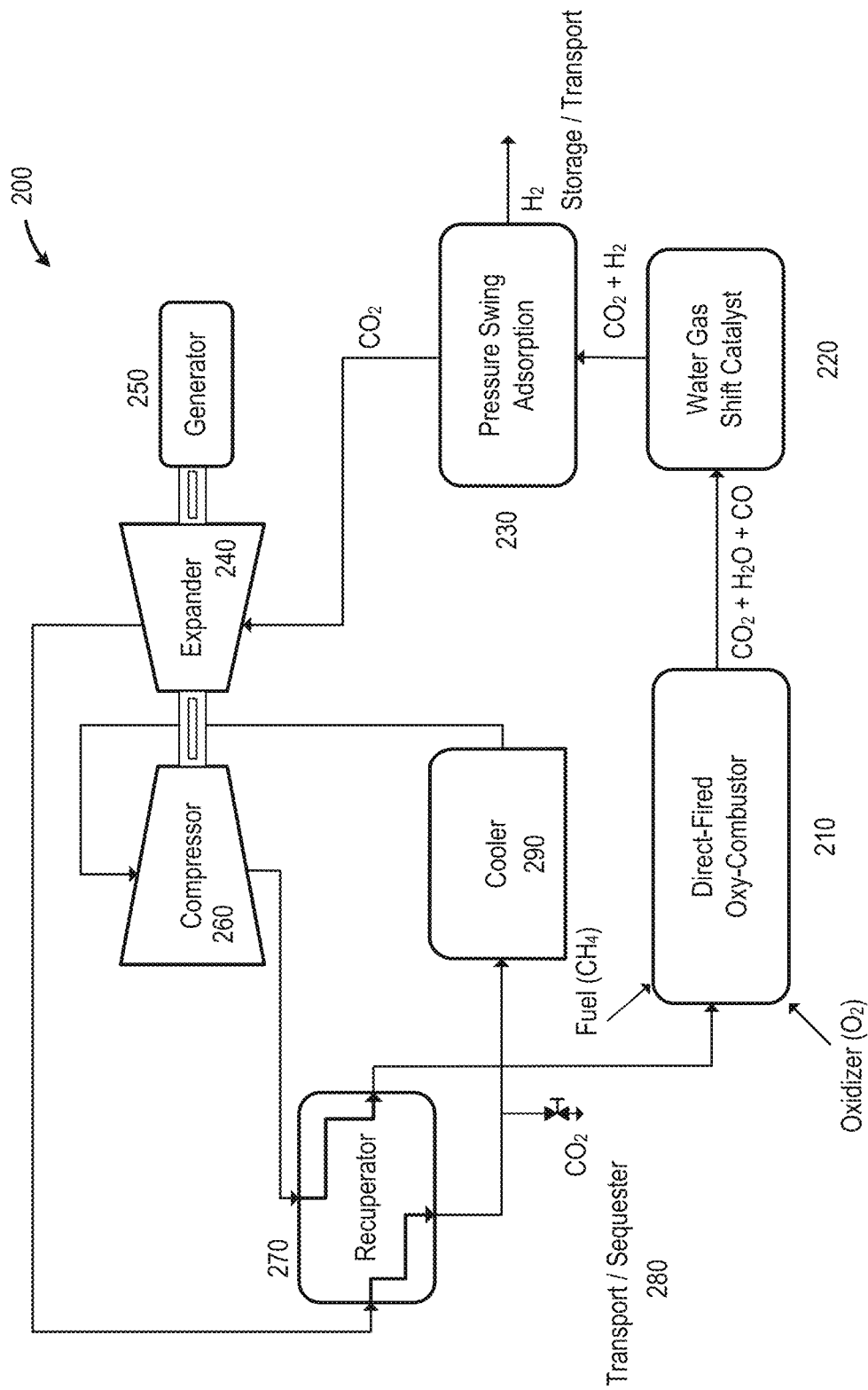
FIG. 2 illustrates a direct-fired supercritical oxy-combustion power cycle as described herein.

Reference is made to FIG. 2 which illustrates a preferred direct-fired supercritical oxy-combustion power cycle 200. Fuel and oxidizer are now introduced into a direct-fired oxycombustor 210, along with preheated supercritical $CO_2$ as the working fluid. The fuel is preferably a hydrocarbon fuel, an example of which is methane. The output of $CO_2$, $H_2O$ and CO are then subject to a water gas shift catalyst which then outputs $CO_2$ and hydrogen ($H_2$). In addition, it is worth mentioning that combustion tuning can be employed herein in order to selectively increase the output of CO, e.g., during a relatively low electric power demand, to produce more hydrogen, as discussed more fully below.

That is, the input of CO and $H_2O$ into the water gas shift reactor at 220 results in formation of a mixture of $CO_2$ and $H_2$, according to the following general water gas shift reaction:

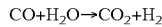

$$CO+H_2O \rightarrow CO_2+H_2$$

Those of skill in the art will recognize that the water gas shift reaction at 220 may proceed at relatively low temperatures (e.g., 200° C. to 250° C.) with catalysts commonly selected from copper or copper oxide loaded ceramic phases. Common supports include alumina or alumina with zinc oxide. One typical composition includes 32-33% CuO, 34-53% ZnO, and 15-33% $Al_2O_3$. The water gas shift reaction may also be conducted at relatively higher temperature utilizing, e.g., a catalyst combination of $Fe_2O_3$, $Cr_2O_3$ and MgO. Such relatively higher temperature catalysis may be in the range of 310° C. to 450° C.

The output of the water gas shift reactor 220 may then be routed to a location where hydrogen is selectively removed from the power cycle. Preferably, this is achieved by a pressure swing adsorption (PSA) processing device 230, but could be achieved by other methods, such as cryogenic separation. Reference to a PSA processing device is reference to the feature that under pressure, the hydrogen gas can be trapped on a solid surface (adsorbed) at relatively high pressure and when the pressure is reduced, the hydrogen gas is released or desorbed. Such solid surface may include porous and adsorbent zeolites, activated carbons, silica and alumina gels. Reference is made to *Hydrogen and Syngas Production and Purification Technologies*, K. Liu, C. Song and V. Subrami (editors), Wiley & Sons, Inc. Publication, 2010. It is therefore contemplated that 90% or more of the hydrogen produced by the water gas shift reaction may be conveniently removed from the supercritical oxy-combustion power cycle 200.

The $CO_2$ output from the pressure swing adsorption processing device 230 is then routed to an expander 240 which may then be used to expand the pressurized $sCO_2$ to provide power to a generator 250 and/or compressor 260. The generator may then provide electrical power. The expander may therefore preferably comprise a turboexpander or expansion turbine through which the relatively high-pressure $sCO_2$ is expanded to produce energy to drive a compressor or generator, as herein described. The $CO_2$ exiting the expander 240 may then be routed through a recuperator 270 after which any excess $CO_2$ can be sequestered and transported at 280. The remaining $CO_2$ may then be routed to a cooler 290 which is then compressed in the compressor 260 and preheated in the recuperator 270 for introduction into the direct-fired oxy combustor 210.

It may now be appreciated that as illustrated in FIG. 2, the water gas shift reaction and the removal of hydrogen via pressure swing adsorption can be utilized directly on the power cycle exhaust stream. Moreover, the combustion in the direct-fired oxy-combustor can be preferably configured to now exploit the benefits of the water gas shift reaction. That is, one may now preferably control the mixture of $CO_2$, $O_2$ and $CH_4$ introduced into the direct-fired oxy-combustor 210 to preferably create relatively similar molar quantities of $H_2O$ and CO for the ensuing water gas shift reaction. Preferably, the respective molar quantities of $H_2O$ and CO exiting the direct-fired oxy-combustor are within +/−20.0% of one another, more preferably +/−10.0%, or even more preferably, +/−5.0% of one another.

It is also worth mentioned that while the water gas shift reactor 220 and pressure swing adsorption processing device 230 are illustrated in FIG. 2 as directly downstream of the direct fired oxy-combustor, such reactor and processing device may be located elsewhere. For example, the water gas shift reactor 220 and the pressure swing adsorption processing device 230 may be located downstream of the recuperator 270, e.g., between the recuperator 270 and transport sequester 280.

Figure 3:
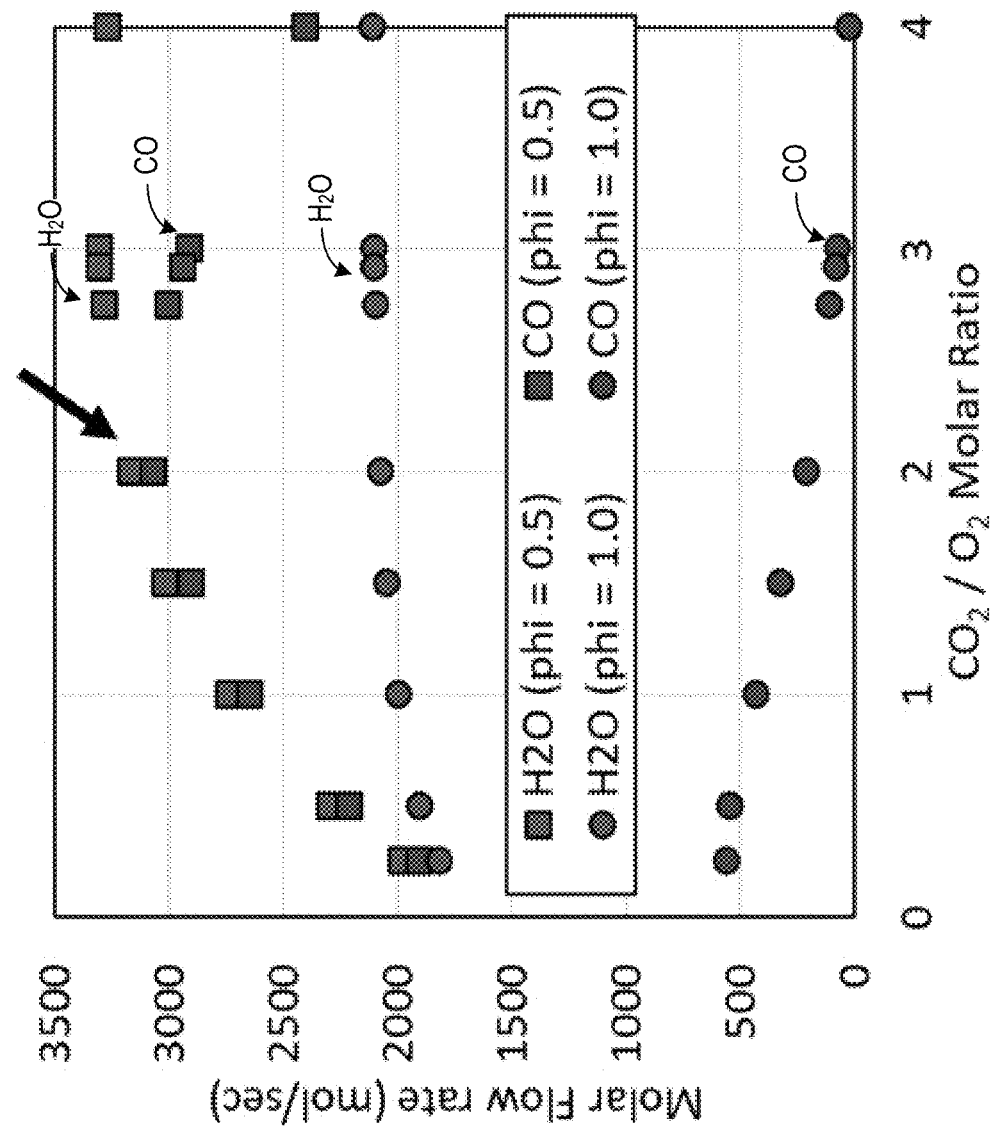
FIG. 3 is a plot of molar mass flow rate of $H_2O$ and CO in mol/sec versus the $CO_2/O_2$ molar ratio in a direct-fired oxy combustor at different equivalence ratios.

FIG. 3 is a plot of the molar mass flow rate of $H_2O$ and CO in mol/sec versus the $CO_2/O_2$ molar ratio in the direct-fired oxy-combustor, at different equivalence ratios (phi), which is reference to the actual air/fuel ratio to the stoichiometric air/fuel ratio. As can be observed, by operation at a value of phi=0.5, and adjustment of the $CO_2/O_2$ molar ratio, the molar flow rate (mol/sec) of $H_2O$ and CO exiting the direct-fired oxy-combustor can be made to be relatively similar. That is, the molar flow rate (mol/sec) of the $H_2O$ and CO exiting the direct-fired oxy-combustor can be configured to be within +/−20.0% of one another, more preferably +/−10.0%, or even more preferably, +/−5.0% of one another. Or, stated another way, the molar flow rate of $H_2O$ and the molar flow rate of CO that are introduced into the water gas shift reactor 220 are each preferably configured to have a value that is within +/−20.0% of one another, more preferably +/−10.0%, or even more preferably, +/−5.0% of one another.

It is also worth mentioning that through modeling protocols, one may also now preferably select pressure and temperatures for introduction of fuel and oxidizer, along with supercritical $CO_2$ to further regulate the presence of $CO_2$, $H_2O$ and CO at the output location of the direct-fired oxy-combustor 210. See, e.g., Delimont, J., Andrews, N. and Chordia, L., *Computational Modeling of a Direct Fired Oxy-Fuel Combustor For SCO2 Power Cycles*", 6th International Supercritical $CO_2$ Power Cycles Symposium, March 2018 (Pittsburgh, Pa.). The combustion process may therefore be further tuned herein to, e.g., inject additional amounts of CO for treatment in the water gas shift reactor 220, to ensure that for a given projected amount of water output, the level of CO is adjusted to optimize the ensuing water gas shift reaction. Stated another way, it is contemplated that the combustion process may be tuned to also minimize the amount of CO that may otherwise be needed to optimize the water gas shift reaction process illustrated in FIG. 2 at 220, so that again, for a given amount of water produced, a requisite amount of CO is present to react with water in the water gas shift reaction at 220 to produce the highest possible amount of $CO_2$ and $H_2$.

In addition, by way of overall operation efficiency, it is contemplated that the present invention can provide, e.g., significant amounts of hydrogen over selected time periods, through use of the subject direct-fired supercritical power cycle disclosed herein. For example, it is contemplated herein that for a 24-hour power generation using the direct-fired supercritical, one can now produce over 1000-1250 kg of hydrogen each day, or higher, depending upon the megawatt output of the power cycle that is at issue.

As may now be appreciated, the present invention provides for a direct-fired supercritical carbon dioxide power cycle where the discharge of the direct-fired oxy-combustor is converted by a water gas shift reaction to carbon dioxide and hydrogen. The hydrogen produced by the water gas shift reactor, as well as $CO_2$, can also be separated from such power cycle and can be conveniently stored/utilized in other applications.

What is claimed:

1. A direct-fired supercritical carbon dioxide power generation method comprising:
   a. burning hydrocarbon fuel and oxygen in a combustor and heating a supercritical $CO_2$ working fluid and providing a combustor output comprising carbon dioxide, carbon monoxide and water;
   b. providing a water gas shift reactor and reacting said carbon monoxide and water output from said combustor and forming a water gas shift reactor output mixture of carbon dioxide and hydrogen wherein the level of said hydrocarbon fuel, oxygen and supercritical $CO_2$ introduced into said combustor are controlled to provide a molar quantity combustor output of water and carbon monoxide from said combustor that are within +/−20.0% of one another;
   c. separating all or a portion of said hydrogen output from said water gas shift reactor; and
   d. driving an expander with said carbon dioxide output from said water gas shift reactor wherein said expander outputs carbon dioxide and said carbon dioxide output from said expander is passed through a recuperator and then cooled, compressed, preheated in said recuperator and introduced into said combustor.

2. The direct-fired supercritical carbon dioxide power generation method of claim 1 including controlling the level of hydrocarbon fuel, oxygen and supercritical carbon dioxide introduced into said combustor so that the molar quantity output of water and carbon dioxide from said combustor are within +/−10.0% of one another.

3. The direct-fired supercritical carbon dioxide power generation method of claim 1 including controlling the level of hydrocarbon fuel, oxygen and supercritical carbon dioxide introduced into said combustor so that the molar quantity output of water and carbon dioxide are within +/−5.0% of one another.

4. The direct-fired supercritical carbon dioxide power generation method of claim 1 including controlling the level of hydrocarbon fuel, oxygen and supercritical carbon dioxide introduced into said combustor so that a molar flow rate combustor output in mol/sec of water and carbon monoxide from said combustor are within +/−20.0% of one another.

5. The direct-fired supercritical carbon dioxide power generation method of claim 1 including controlling the level of hydrocarbon fuel, oxygen and supercritical carbon dioxide introduced into said combustor so that a molar flow rate combustor output in mol/sec of water and carbon monoxide from said combustor are within +/−10.0% of one another.

6. The direct-fired supercritical carbon dioxide power generation method of claim 1 including controlling the level of hydrocarbon fuel, oxygen and supercritical carbon dioxide introduced into said combustor so that a molar flow rate combustor output in mol/sec of water and carbon monoxide from said combustor are within +/−5.0% of one another.

\* \* \* \* \*